US012633827B1

(12) United States Patent
Maru et al.

(10) Patent No.: US 12,633,827 B1

(45) Date of Patent: May 19, 2026

(54) OUTPUT VOLTAGE OVERSHOOT-BASED OPERATING PARAMETER ADJUSTMENT IN A SWITCHED-POWER CONVERTER CIRCUIT

(71) Applicant: CIRRUS LOGIC INTERNATIONAL SEMICONDUCTOR LTD., Edinburgh (GB)

(72) Inventors: Siddharth Maru, Austin, TX (US); Pietro Gallina, Chandler, AZ (US); Bryan W. McCoy, Phoenix, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 441 days.

(21) Appl. No.: 18/215,919

(22) Filed: Jun. 29, 2023

Related U.S. Application Data

(60) Provisional application No. 63/399,061, filed on Aug. 18, 2022.

(51) Int. Cl.
H02M 3/158 (2006.01)
H02M 1/088 (2006.01)

(52) U.S. Cl.
CPC ........... H02M 3/158 (2013.01); H02M 1/088 (2013.01)

(58) Field of Classification Search
CPC .............................. H02M 3/158; H02M 1/088
See application file for complete search history.

(56) References Cited

U.S. PATENT DOCUMENTS

2022/0302838 A1* 9/2022 Eleftheriadis ......... H02M 3/156

* cited by examiner

*Primary Examiner* — Rafael O De Leon Domenech
(74) *Attorney, Agent, or Firm* — Mitch Harris, Atty at Law, LLC; Andrew M. Harris

(57) ABSTRACT

A method implemented by a control circuit adaptively controls operating parameters of a switched-mode power supply to compensate for variation in circuit parameters of the switched-mode power supply, such as variation of: an inductance of an inductor, a capacitance of an output capacitor, and variation of a load capacitance coupled to an output of the switched-mode power supply. The control circuit includes a comparison circuit that determines whether or not an output voltage of the switched-mode power supply has exceeded an overshoot threshold, and a switching control circuit that has an input coupled to an output of the comparison circuit. The switching control circuit adaptively adjusts a control variable that controls one or more operational parameters of the switched-mode power supply in conformity with a relationship between a value of the output voltage and a value of the overshoot threshold in response to the output of the comparison circuit.

24 Claims, 5 Drawing Sheets

OUTPUT VOLTAGE OVERSHOOT-BASED OPERATING PARAMETER ADJUSTMENT IN A SWITCHED-POWER CONVERTER CIRCUIT

FIELD OF THE DISCLOSURE

The field of representative embodiments of this disclosure relates to operational control of switched-mode power supplies, amplifiers and other switched-mode power converters, and in particular, to techniques that use output voltage overshoot to determine adjustments to operating parameters of the switched-power converters.

BACKGROUND

Switched-power conversion circuits are commonly used in power supplies and amplification systems due to high power efficiency and reduced magnetic component weight and size. By switching current at a frequency greater than the frequencies to be reproduced by an amplifier, or by switching energy generally, in the case of switching power supplies, the size of magnetic components is reduced and losses required by linear circuit operation are eliminated.

In power-managed applications and in power management integrated circuits (ICs), such switched-power conversion circuits are used for both efficiency and adaptability to different power requirements/energy use conditions, particularly in battery-operated applications. Switched-power converters can be operated in different operating modes that trade off absolute efficiency for reduced power overhead/total energy use. For example, a switched-power converter may be operated in continuous-conduction mode (CCM) when energy use is high, which provides high efficiency, and when energy use is low, the same switched-power converter may be operated in discontinuous-conduction mode (DCM) or pulse-frequency modulated mode (PFM) which reduces total energy use by incurring switching overhead losses only when energy is needed from the power supply rail(s) to which the switched-power converter is providing energy.

However, operation in a low-power mode such as PFM or DCM has the potential to increase electromagnetic interference (EMI) generated by the switched-power converter, as well as increases in potential operational stresses on the load, due to increased voltage ripple and possible output voltage overshoot. In order to provide the highest efficiency, switching of the switched-power converter is performed as infrequently as possible, while maintaining a minimum output voltage. A low frequency of operation is ensured by pushing as much charge as possible into the output filter capacitor (and any connected distributed capacitance of the load) and then ceasing switching operation. The amount of charge that can be transferred to the output is dictated by the maximum voltage permitted on the output, which is generally the maximum overshoot voltage, although there may be a different rating for voltage transients vs. continuous maximum output voltage. The total amount of charge transferred over the intervals in which the switched-power converter is operated is determined by not only the maximum output voltage, but by the minimum output voltage at which the switching of the switched-power is triggered, and therefore the output voltage ripple is determined by the minimum and maximum output voltages in low-power mode.

The amount of charge transferred is dependent on circuit parameters of the switched-power converter, since, as noted above, the load capacitance and the output filter capacitance determine the charge transfer $\Delta q$ over the intervals, since $\Delta q = \Delta V \, (C_{LOAD} + C_{FILTER})$, where $\Delta q$ is the total transferred charge, $\Delta V$ is the output voltage change, and $C_{LOAD}$ and $C_{FILTER}$ are the load and filter capacitances, respectively. The inductance of the magnetic storage element that is used in the switched-power converter also has an impact on the length of the intervals/amount of charge transferred, since the maximum stored energy transferred each switching cycle is dependent on the inductance. The variation of the circuit parameters typically dictates a very conservative switched-power converter design, especially for switched-power converter circuits that may encounter large variations in load capacitance and inductor values. Input voltage and temperature also impacts the operating parameters, even when nominal values of inductance and capacitance are known. For example, the lowest supported output capacitance limits the allowable peak current/on-time for a given voltage ripple, since it is a minimum capacitance that the voltage ripple will be greatest. Limitations on the peak current/magnetization on-time of the converter limits the amount of charge that may be pushed to the output capacitance per cycle, and those limitations are voltage and inductance-dependent. The minimum achievable frequency of the converter is also determined by each of the above circuit parameters, as the converter must push enough charge to meet the change in output voltage at the maximum possible output capacitance, which is limited by the value of the inductance and the minimum value of the input voltage. The controller of the switched-mode power converter may adjust operating parameters of the converter, e.g., the pulse-width, pulse frequency, and peak inductor current to compensate for the variation of circuit parameters, but input information is required about the circuit parameters in order to make such adjustments.

Therefore, it would be advantageous to provide a switched-power converter circuit in which the operational parameters of the circuit may be adapted dynamically during operation and without decreasing efficiency or introducing additional cost/circuit area.

SUMMARY

Adjustment of operational parameters in a switched-mode power converter, is provided in an adaptive switched-mode power converter control circuit and its method of operation.

The control circuit adaptively controls operating parameters of a switched-mode power supply, and includes a comparison circuit that determines whether or not an output voltage of the switched-mode power supply has exceeded an overshoot threshold, and a switching control circuit that has an input coupled to an output of the comparison circuit. The switching control circuit adaptively adjusts a control variable that controls one or more operational parameters of the switched-mode power supply in conformity with a relationship between a value of the output voltage and a value of the overshoot threshold in response to the output of the comparison circuit. The one or more operational parameters may include one or more of a peak inductor current, an on-time of a switch of the switched-mode power supply, or a number of consecutive switching pulses of the switched-mode power supply. The circuit parameters compensated for may include one or more of a variation of an inductance of an inductor of the switched-mode power converter and/or variation of a capacitance of an output capacitor and load capacitance coupled to the switched-mode power converter.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION

The present disclosure encompasses systems, circuits and integrated circuits that control switched-mode power supplies (SMPSs) or other switched-power circuits and their methods of operation. The SMPS is generally a type of SMPS that responds by adjusting operating frequency when a change in demand or input voltage occurs, which may be operation in a low-power mode, such as in a SMPS that changes from continuous conduction mode (CCM) to pulse frequency mode (PFM) of discontinuous conduction mode (DCM), when demand for output current is low. The methods may control one or more operational parameters of the SMPS, such as peak inductor current, an on-time of a switch of the SMPS, or a number of consecutive switching pulses of the SMPS, in order to compensate for variations in circuit parameters of the SMPS, such as variation of an inductance of an inductor of the switched-mode power supply, variation of a capacitance of an output capacitor, and variation of a load capacitance coupled to an output of the switched-mode power supply. The methods may include determining whether or not an output voltage of the switched-mode power supply has exceeded an overshoot threshold, and in response a result of the determining, adaptively adjusting a control variable that controls one or more operational parameters of the switched-mode power supply in conformity with a relationship between a value of the output voltage and a value of the overshoot threshold.

Figure 1:
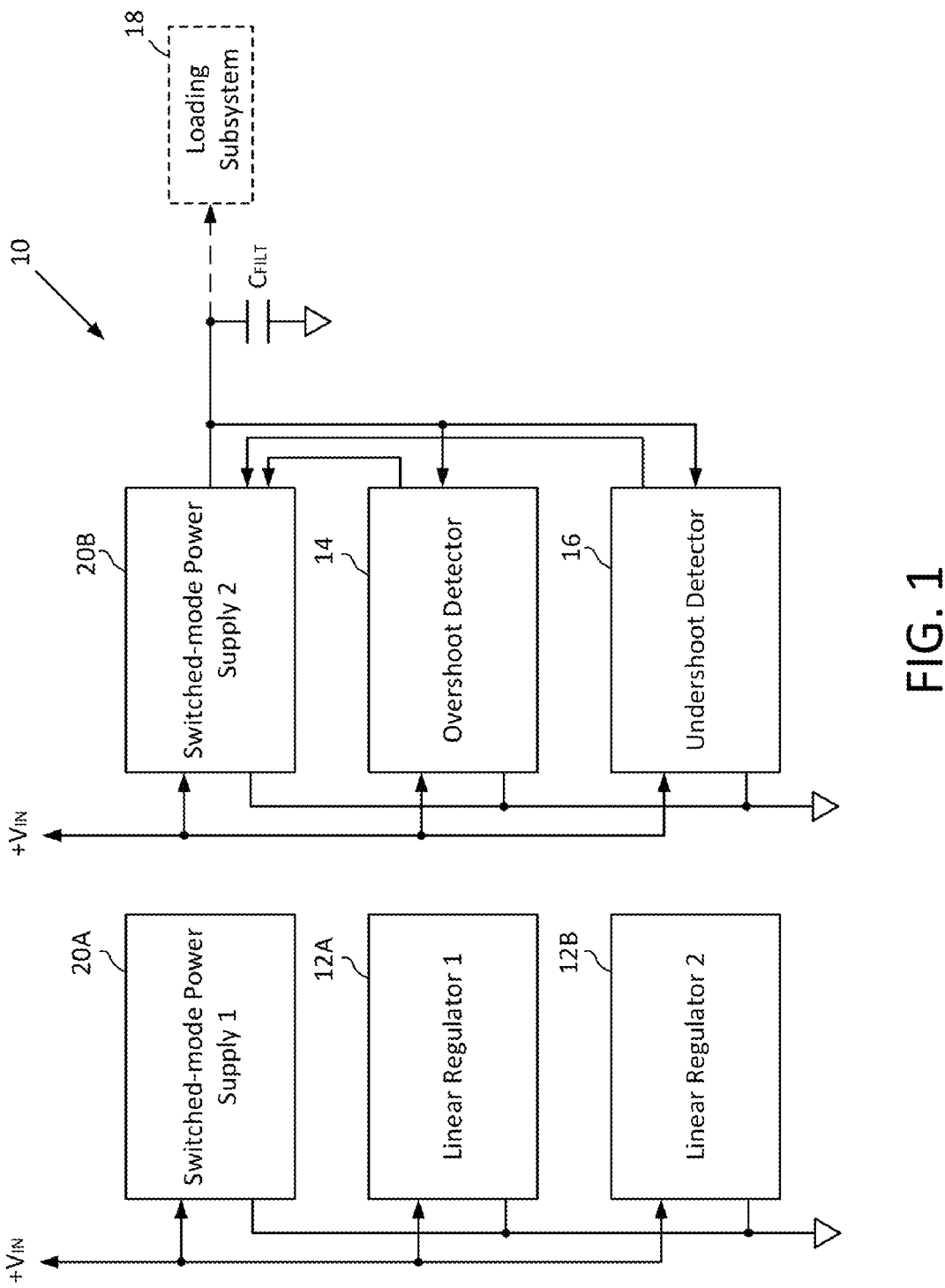
FIG. 1 is a block diagram illustrating an example power management integrated circuit (PMIC) 10, in accordance with an embodiment of the disclosure.

Referring now to FIG. 1, a block diagram illustrating an example power management integrated circuit (PMIC) 10 is shown, in accordance with an embodiment of the disclosure. PMIC 10 includes a plurality of power supply units: SMPSs 20A-20B and linear regulators 12A-12B provide power to various loads in a connected system. In particular, SMPS 20B provides power to a connected loading subsystem 18 and has a connection to an external output filter capacitor $C_{FILT}$. While each of SMPSs 20A-20B and linear regulators 12A-12B are operated from a common input power supply rail+$V_{IN}$ for purposes of illustration, separate power supply rail inputs may be provided to each power supply unit, or groups of power supply units. The output of SMPS 20B is coupled to an overshoot detector 14 and an undershoot detector 16, which may be provided for various management functions of PMIC 10, but that are also used to provide input to a control mechanism of SMPS 20B as described in further detail below with reference to various embodiments of the disclosure that manage the operation of SMPS 20B to compensate for variation in the circuit parameters of SMPS 20B, including the capacitance value of external output filter capacitor $C_{FILT}$, the impedance of loading subsystem 18 and also components of SMPS 20B, which may, for example, include one or more magnetic storage components that are, in practice, provided external to PMIC 10.

Figure 2:
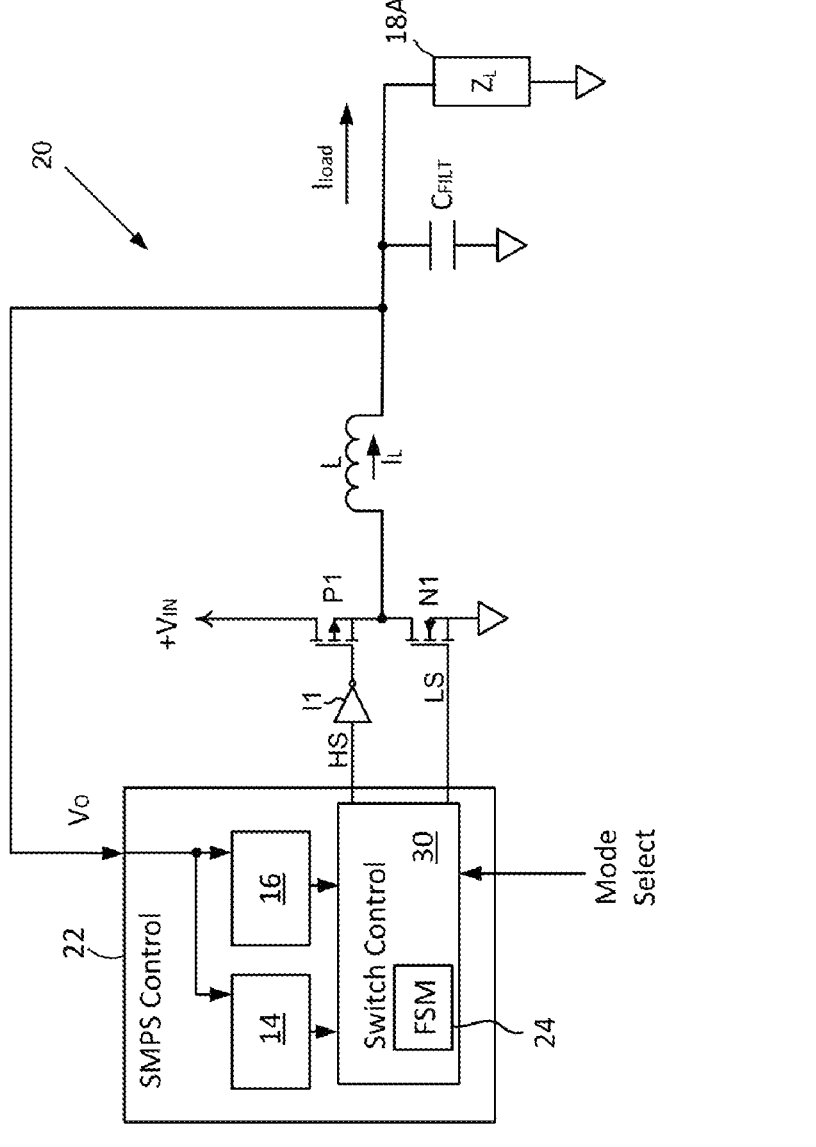
FIG. 2 is a simplified schematic diagram illustrating an example switched-mode power supply (SMPS) 20 that may be used to implement switched-mode power supplies 20A-20B in example PMIC 10 of FIG. 1, in accordance with an embodiment of the disclosure.

Referring now to FIG. 2, a simplified schematic diagram of an example SMPS 20 that may be used to implement switched-mode power supplies 20A-20B in example PMIC 10 of FIG. 1 is shown, in accordance with an embodiment of the disclosure. A SMPS control circuit 22 receives a measure of output voltage $V_o$ as an input and controls operation of an example buck converter switched-power stage formed by transistor P1 and N1. Transistors P1 and N1 direct a current IL through an inductor L, that in turn, charges output filter capacitor $C_{FILT}$ to maintain an output voltage $V_o$ across a load 18A, by supplying a load current $I_{load}$. Transistor P1 is activated according to a high-side control signal HS through an inverter I1, and then transistor N1 is activated by a low-side control signal LS. SMPS control circuit 22 generates high-side control signal HS and low-side control signal LS to maintain output voltage $V_o$ in both a high-power operating mode and a low-power/high-efficiency operating mode as selected by a control signal Mode Select. In the high-power operating mode, high-side control signal HS and low-side control signal LS may cause inductor current IL to be a continuously cycling waveform, in a continuous-conduction mode (CCM). In the low-power operating mode, high-side control signal HS and low-side control signal LS are operated to provide one or more magnetization/de-magnetization cycles of inductor L as needed to maintain output voltage $V_o$ above a minimum (undershoot) level, i.e., individual cycles or bursts, which may be triggered by undershoot detector 16, as a pulse frequency modulated (PFM) or discontinuous-conduction mode (DCM) controller. A switch control circuit 30 selects between generating high-side control signal HS and low-side control signal LS as CCM control signals, e.g., pulse-width modulated (PWM) signals, or PFM/DCM control signals, according to the state of control signal Mode Select.

In particular, the embodiments described below concern the low-power PFM/DCM mode, in which switch control circuit 30, which may be implemented by an analog circuit, a digital circuit, or a micro-controller core, as a programmatic or hard-wired finite state machine (FSM) 24, operates to activate high-side control signal HS and low-side control signal LS to generate individual switching cycles or bursts of cycles, to maintain output voltage $V_o$ above the undershoot level by permitting output voltage $V_o$ to occasionally exceed an overshoot voltage level, as detected by overshoot detector 14. FSM 24 adaptively controls the frequency of the individual cycles or bursts, by maintaining the variation of one or more operational parameters of SMPS 20, to cause the occasional activation of overshoot detector 14, effectively closing an adaptive control loop around output voltage $V_o$, which, in turn, compensates for the variation of circuit parameters of SMPS 20 that affect output voltage $V_o$, such as the combined capacitance of output filter capacitor $C_{FILT}$ and load 18A. The operational parameters of SMPS 20 that may be varied include the peak inductor current, the pulse-width of high-side control signal HS, and/or a number of consecutive switching pulses of the switched-mode power supply that are issued in a burst. In the depicted buck converter embodiment as illustrated by SMPS 20 of FIG. 2, the pulse-width high-side control signal HS determines the peak inductor current, but a buck converter is only one example of a system in which the techniques disclosed herein may be employed, and the disclosed techniques may be applied to other SMPS topologies and switched-mode power delivery systems generally.

Figure 3A:
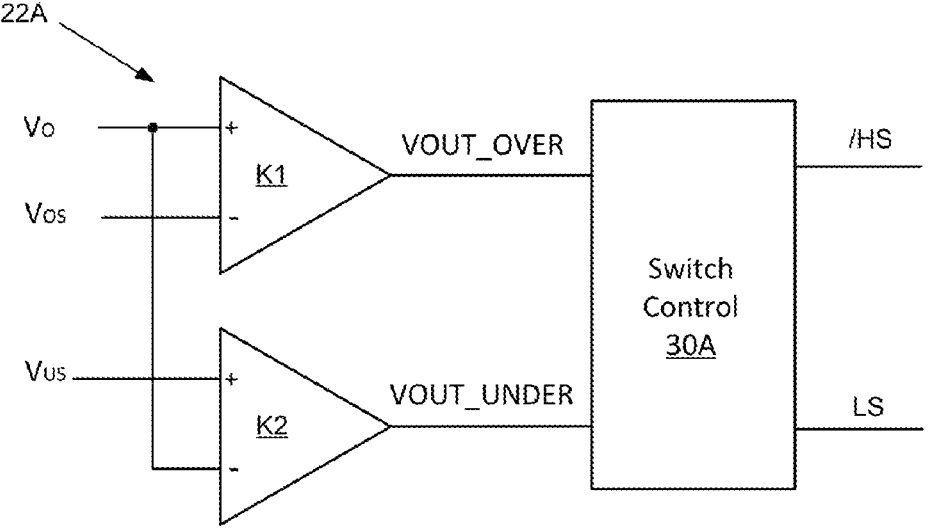
FIG. 3A is a simplified schematic diagram illustrating details of an example SMPS control circuit 22A, which may be used to implement SMPS control circuit 22 in example SMPS 20 of FIG. 2, in accordance with an embodiment of the disclosure.

Referring now to FIG. 3A, a simplified schematic diagram illustrating details of an example SMPS control circuit 22A, which may be used to implement SMPS control circuit 22 in example SMPS 20 of FIG. 2 is shown, in accordance with an embodiment of the disclosure. A pair of comparators K1 and K2, compare output voltage $V_o$ to an overshoot threshold voltage $V_{os}$ and an undershoot voltage threshold $V_{us}$, respectively, and provide respective input indications VOUT_OVER and VOUT_UNDER to a switch control block 30A that may include, as mentioned above, an analog circuit, a digital circuit, a micro-controller core, or a hybrid of any of the above. Switch control block 30A generates high-side control signal HS and low-side control signal LS according to a state machine that implements an adaptive control loop as described in further detail below. The adaptive control loop implemented by switch control block 30A does not require, in general, input from undershoot indication VOUT_UNDER as part of the adaptive control loop, in contrast to a so-called "bang-bang" controller. However, undershoot indication VOUT_UNDER is used as an indication to commence a cycle or burst when SMPS control 22 is in the low-power/high-efficiency mode, and as such, forms part of the input to the overall SMPS control scheme. Further details of the adaptive operation of switch control block 30A will be described in further detail below, with reference to FIGS. 4A-4B and FIG. 5.

Figure 3B:
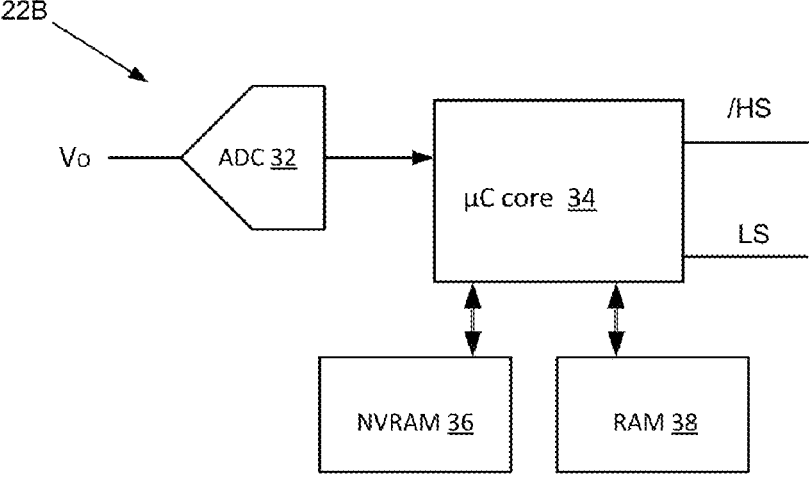
FIG. 3B is a simplified schematic diagram illustrating details of another example SMPS control circuit 22B, which may be used to implement SMPS control circuit 22 in example SMPS 20 of FIG. 2, in accordance with another embodiment of the disclosure.

Referring now to FIG. 3B, a simplified schematic diagram illustrating details of another example SMPS control circuit 22B, which may be used to implement SMPS control circuit 22 in example SMPS 20 of FIG. 2 is shown, in accordance with another embodiment of the disclosure. The function of SMPS control circuit 22B is generally the same as SMPS control circuit 22A of FIG. 3A, so only differences between the circuits will be described in detail below. In SMPS control circuit 22B output voltage $V_o$ is measured by an analog-to-digital converter (ADC) 32 to provide samples of the output voltage $V_o$ for evaluation by a program executed by a micro-controller (μC) core 34. The program instructions form a computer program product stored in a non-volatile memory (NVRAM) 36 that carries out methods as described herein to perform the generation of high-side control signal HS and low-side control signal LS according to the state machine described below, with reference to FIGS. 4A-4B and FIG. 5. NVRAM 36 may also store program constants or factory/field-determined values, such as overshoot threshold voltage $V_{os}$ and undershoot voltage threshold $V_{us}$. Storage for program data such as samples of output voltage $V_o$ is provided by a random-access memory (RAM) 38.

Figures 4A, 4B:
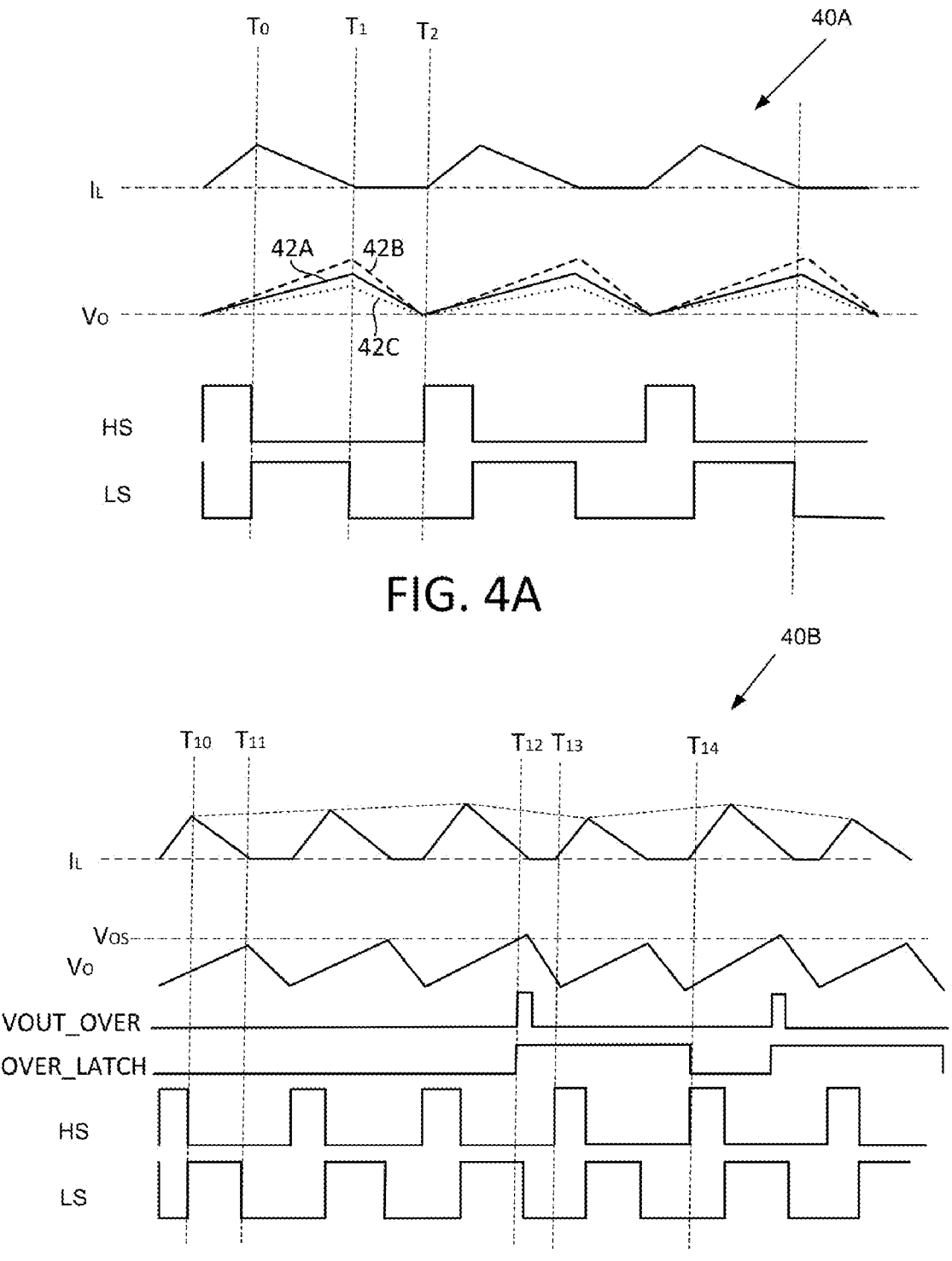
FIG. 4A and FIG. 4B are signal waveform diagrams illustrating an example operation of example SMPS 20 of FIG. 2, in accordance with an embodiment of the disclosure.

Referring now to FIG. 4A, a signal waveform diagram 40A illustrating an example operation of example SMPS 20 of FIG. 2 is shown, in accordance with an embodiment of the disclosure. Peaks of inductor current IL occur at times, e.g., a time $T_o$ at the end of assertions of high-side control signal HS and the beginnings of assertions of low-side control signal LS. Output voltage waveforms 42A, 42B and 42C represent waveforms of output voltage $V_o$ for a nominal value of the total output capacitive load, for a lower value of the total output capacitive load, and for a higher value of the total output capacitive load, respectively. Because the voltage variation, i.e., the output ripple voltage, varies directly with the value of the output capacitive load, the peak value of output voltage $V_o$, e.g., at a time $T_1$ can be compared to overshoot threshold voltage $V_{os}$ to form the control input for the adaptive control loop described herein, which acts to adjust the peak value of output voltage $V_o$ by adjusting operating parameters of SMPS 20 at the next switching cycle that commences at a time $T_2$, or alternatively at another periodic interval, such as controlling a number of pulses in bursts of switching cycles at the beginnings of the bursts. The control loop effectively counteracts the variation in the peak value of output voltage $V_o$ due to circuit parameter variation, including variation of the total output capacitive load, including variation between particular applications/installations, individual component variation, and temperature-dependence of the circuit parameters.

Referring now to FIG. 4B, another signal waveform diagram 40B illustrating example operation of example SMPS 20 of FIG. 2 is shown, in accordance with an embodiment of the disclosure. The per-cycle energy transfer is determined at, e.g., time $T_{10}$ by the width of high-side control signal HS, which terminates at, e.g., time $T_{10}$. In the illustration, the width of high-side control signal HS is increasing at each switching cycle, due to the previous state of the adaptive state machine. The increasing width of high-side control signal HS causes the peak values of output voltage $V_o$, which occur at, e.g., a time $T_{11}$, to increase with each switching cycle, until at a time $T_{12}$, the value of output voltage $V_o$ crosses overshoot threshold voltage $V_{os}$, setting control value VOUT_OVER, which in the depicted example, is held/latched for an entire switching cycle as a control value VOVER_LATCH until a time $T_{14}$. The setting of control value VOVER_LATCH causes the state machine to begin decreasing the per-cycle energy transferred in SMPS 20, by decreasing the pulse width of high-side control signal HS, e.g., at a time $T_{13}$. As illustrated, the steady-state operation of the adaptive control loop cycles through small variations in the peak value of output voltage $V_o$, which maintains continuous closed-loop operation of the adaptive control loop. With the cycle beginning just before time $T_{12}$, the illustrated operation cycles between two values of peak current, as output voltage $V_o$ exceeds overshoot threshold $V_{os}$ at alternate cycles. Depending on the particular time constant of the state machine algorithm employed, the alternation may encompass greater than a single cycle, according to different embodiments of the disclosure. In other embodiments undershoot threshold $V_{us}$ may be used to determine when to increase the peak inductor current, so that output voltage $V_o$ cycles between exceeding overshoot threshold $V_{os}$ and falling below undershoot threshold $V_{us}$ over two or more switching cycles.

Figure 5:
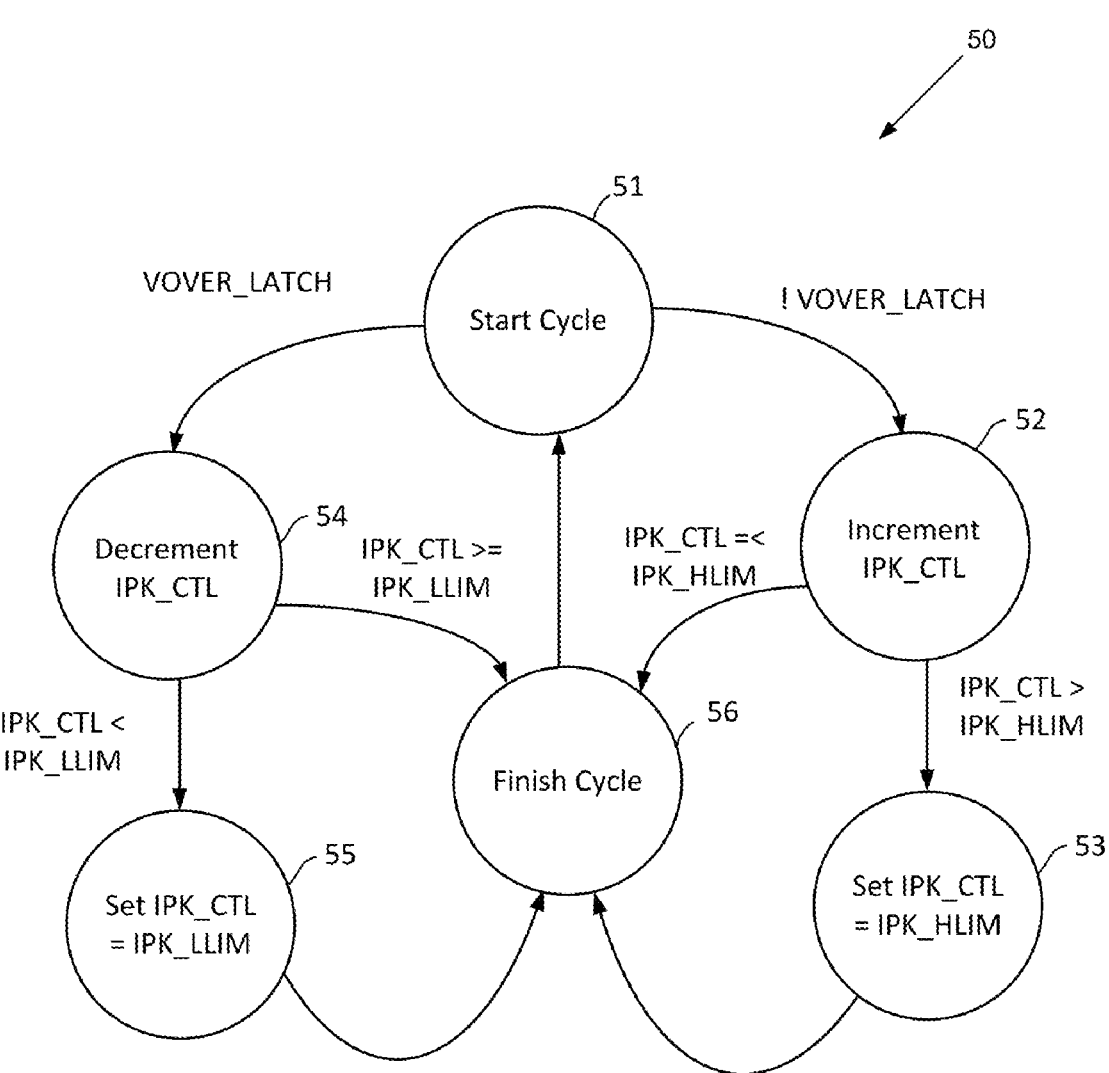
FIG. 5 is a state diagram 50 illustrating an example operation of example SMPS control circuit 12 in SMPS 20 of FIG. 2, in accordance with an embodiment of the disclosure.

FIG. 5 is a state diagram 50 illustrating an example operation of example SMPS control circuit 12 in SMPS 20 of FIG. 2, in accordance with an embodiment of the disclosure. The depicted state diagram implements an example of a linear increment/decrement adaptive control scheme, but a more complex adaptive control scheme including filtering, time-weighting, and/or non-linear control schemes may alternatively be implemented, and are contemplated by this disclosure. A switching cycle is started in state 51, If VOVER_LATCH is not set (!VOVER_LATCH=TRUE), then a state variable IPK_CTL is incremented in state 52. If state variable IPK_CTL is greater than an upper bound IPK_HLIM, then state variable IPK_CTL is limited to upper bound IPK_HLIM in state 53, by setting IPK_CTL to IPK_HLIM, otherwise control transitions to state 56 to complete the switching cycle. Control also transitions to state 56, if state 53 was entered, then in either case, control returns to state 51 at the start of the next cycle. If VOVER_LATCH is set (VOVER_LATCH=TRUE), then state variable IPK_CTL is decremented in state 54. If state variable IPK_CTL is less than a lower bound IPK_LLIM, then state variable IPK_CTL is set to lower bound IPK_LLIM in state 55, otherwise control transitions to state 56 to complete the switching cycle. Control also transitions to state 56, if state 55 was entered, then in either case, control returns to state 51 at the start of the next cycle. The value of state variable IPK_CTL is used to control one or more operational parameters of SMPS 20, to perform the adaptive control. For example, state variable IPK_CTL may be mapped/scaled directly to the pulse width of high-side control signal HS, so that as state variable IPK_CTL increases, the pulse width of high-side control signal HS increases linearly therewith, and as state variable IPK_CTL decreases, the pulse width of high-side control signal HS decreases in a corresponding manner.

In summary, this disclosure shows and describes methods and circuits for adaptively controlling operational parameters of a switched-mode power supply. The methods may include: determining whether or not an output voltage of the switched-mode power supply has exceeded an overshoot threshold, and in response to a result of the determining, adaptively adjusting a control variable that controls one or more operational parameters of the switched-mode power supply in conformity with a relationship between a value of the output voltage and a value of the overshoot threshold. The circuit is a control circuit that may include a comparison circuit that determines whether or not an output voltage of the switched-mode power supply has exceeded an overshoot threshold, and a switching control circuit having an input coupled to an output of the comparison circuit. The switching control circuit may adaptively adjust a control variable that controls one or more operational parameters of the switched-mode power supply in conformity with a relationship between a value of the output voltage and a value of the overshoot threshold in response to the output of the comparison circuit.

In some example embodiments, the adaptively adjusting may compensate for one or more of a variation of an inductance of an inductor of the switched-mode power supply, variation of a capacitance of an output capacitor, or a variation of a load capacitance coupled to an output of the switched-mode power supply. In some example embodiments, the adaptively adjusting optimizes one or both of an efficiency or output voltage ripple of the switched-mode power supply. In some example embodiments, adjusting may be performed at least until the determining determines that the output voltage does not exceed the threshold. In some example embodiments, the adaptively adjusting adjusts the control variable by a predetermined step size at each cycle of the switched-mode power supply until the determining determines that the output voltage does not exceed the threshold. In some example embodiments, the adaptively adjusting is performed continuously during operation of the switched-mode power supply.

In some example embodiments, the method may further include, prior to performing the adaptively adjusting, determining whether a next change of the adaptively adjusting will exceed a predetermined adjustment range. Responsive to determining that the next change of the adaptively adjusting will exceed the predetermined adjustment range, the method may reset the control variable. Responsive to determining that the next change of the adaptively adjusting will not exceed not the predetermined adjustment range, the method may perform the adaptively adjusting. In some example embodiments, the method may further include selecting between operating the switched-mode power supply between lower-power operating mode and a higher-power operating mode, and the adaptively adjusting may be performed when the lower-power operating mode is selected, and not performed when the higher-power operating mode is selected. In some example embodiments, the higher-power operating mode may be a continuous-conduction mode, and the lower-power operating mode may be a discontinuous-conduction mode or a pulse-frequency modulated mode. In some example embodiments, the determining may be performed by a comparator that compares the output voltage to the overshoot threshold. In some example embodiments, the determining may be performed by a program or control logic that receives a representation of the output voltage from an analog-to-digital converter, wherein the program or control logic compares the output voltage to the overshoot threshold to perform the determining.

As mentioned above, portions or all of the disclosed process may be carried out by a state machine, which may be provided by a logic circuit, or the execution of a collection of program instructions forming a computer program product stored on a non-volatile memory, and executed by a controller core. Such programs may also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than the non-volatile memory described above also form a computer program product that is an article of manufacture including instructions which implement aspects of the functions/actions specified in the block diagram block or blocks, as well as method steps described herein.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of switched-power system.

What is claimed is:

1. A method for adaptively controlling operating parameters of a switched-mode power supply, comprising:

during steady state operation of an adaptive control loop of the switched-mode power supply, determining whether or not an output voltage of the switched-mode power supply has exceeded an overshoot threshold; and in response to a result of the determining and during the steady state operation of the adaptive control loop of the switched-mode power supply, adaptively adjusting a control variable that controls one or more operational parameters of the switched-mode power supply in conformity with a relationship between a value of the output voltage and a value of the overshoot threshold.

2. The method of claim 1, wherein the adaptively adjusting compensates for one or more of variation of an inductance of an inductor of the switched-mode power supply, variation of a capacitance of an output capacitor, and variation of a load capacitance coupled to an output of the switched-mode power supply.

3. The method of claim 2, wherein the adaptively adjusting optimizes one or both of an efficiency or output voltage ripple of the switched-mode power supply.

4. The method of claim 1, wherein the one or more operational parameters includes one or more of peak inductor current, an on-time of a switch of the switched-mode power supply, or a number of consecutive switching pulses of the switched-mode power supply.

5. The method of claim 1, wherein the adaptively adjusting is performed at least until the determining determines that the output voltage does not exceed the threshold.

6. The method of claim 5, wherein the adaptively adjusting adjusts the control variable by a predetermined step size at each cycle of the switched-mode power supply until the determining determines that the output voltage does not exceed the threshold.

7. The method of claim 1, wherein the adaptively adjusting is performed continuously during operation of the switched-mode power supply.

8. The method of claim 1, further comprising:

prior to performing the adaptively adjusting, determining whether a next change of the adaptively adjusting will exceed a predetermined adjustment range;

responsive to determining that the next change of the adaptively adjusting will exceed the predetermined adjustment range, resetting the control variable; and responsive to determining that the next change of the adaptively adjusting will not exceed the predetermined adjustment range, performing the adaptively adjusting.

9. The method of claim 1, further comprising selecting between operating the switched-mode power supply between lower-power operating mode and a higher-power operating mode, wherein the adaptively adjusting is performed when the lower-power operating mode is selected, and wherein the adaptively adjusting is not performed when the higher-power operating mode is selected.

10. The method of claim 9, wherein the higher-power operating mode is a continuous-conduction mode, and wherein the lower-power operating mode is a discontinuous-conduction mode or a pulse-frequency modulated mode.

11. The method of claim 1, wherein the determining is performed by a comparator that compares the output voltage to the overshoot threshold.

12. The method of claim 1, wherein the determining is performed by a program or control logic that receives a representation of the output voltage from an analog-to-digital converter, wherein the program or control logic compares the output voltage to the overshoot threshold to perform the determining.

13. A circuit that adaptively controls operating parameters of a switched-mode power supply, the circuit comprising:

a comparison circuit that determines during steady state operation of an adaptive control loop of the switched-mode power supply, whether or not an output voltage of the switched-mode power supply has exceeded an overshoot threshold; and a switching control circuit having an input coupled to an output of the comparison circuit, wherein the switching control circuit adaptively adjusts a control variable that controls one or more operational parameters of the switched-mode power supply in conformity with a relationship between a value of the output voltage and a value of the overshoot threshold in response to the output of the comparison circuit during the steady state operation of the adaptive control loop of the switched-mode power supply.

14. The circuit of claim 13, wherein the switching control circuit compensates for one or more of variation of an inductance of an inductor of the switched-mode power supply, variation of a capacitance of an output capacitor, and variation of a load capacitance coupled to an output of the switched-mode power supply.

15. The circuit of claim 14, wherein the switching control circuit optimizes one or both of an efficiency or output voltage ripple of the switched-mode power supply.

16. The circuit of claim 13, wherein the one or more operational parameters includes one or more of peak inductor current, an on-time of a switch of the switched-mode power supply, or a number of consecutive switching pulses of the switched-mode power supply.

17. The circuit of claim 13, wherein the switching control circuit adaptively adjusts the control variable at least until the determining determines that the output voltage does not exceed the threshold.

18. The circuit of claim 17, wherein the switching control circuit adaptively adjusts the control variable by a predetermined step size at each cycle of the switched-mode power supply until the output of the comparison circuit indicates that the output voltage does not exceed the threshold.

19. The circuit of claim 13, wherein the switching control circuit adaptively adjusts the control variable continuously during operation of the switched-mode power supply.

20. The circuit of claim 13, wherein the switching control circuit, prior to adjusting the control variable, determines whether a next change of the adaptively adjusting will exceed a predetermined adjustment range, and responsive to determining that the next change of the adaptively adjusting will exceed the predetermined adjustment range, resets the control variable, and wherein the switching control circuit, responsive to determining that the next change of the adaptively adjusting will not exceed the predetermined adjustment range, performs the adaptively adjusting.

21. The circuit of claim 13, wherein the switching control circuit selects between operating the switched-mode power supply between lower-power operating mode and a higher-power operating mode, and wherein the switching control circuit performs the comparison and adaptively adjusts the control variable when the lower-power operating mode is selected and does not adaptively adjust the control variable when the higher-power operating mode is selected.

22. The circuit of claim 21, wherein the higher-power operating mode is a continuous-conduction mode, and wherein the lower-power operating mode is a discontinuous-conduction mode or a pulse-frequency modulated mode.

23. The circuit of claim 13, wherein the comparison circuit is a comparator that compares the output voltage to the overshoot threshold.

24. The circuit of claim 13, wherein the switching control circuit executes a program or includes control logic that receives a representation of the output voltage from an analog-to-digital converter, wherein the program or control logic compares the output voltage to the overshoot threshold to perform the determining.

\* \* \* \* \*